United States Patent [19]

Riemer

[11] Patent Number: 5,346,355
[45] Date of Patent: Sep. 13, 1994

[54] ROOF TOP CARRIER

[76] Inventor: Edwin Riemer, 7813 Leavorite Dr., Las Vegas, Nev. 89128

[21] Appl. No.: 71,452

[22] Filed: Jun. 3, 1993

Related U.S. Application Data

[63] Continuation-in-part of Ser. No. 801,482, Dec. 2, 1991, abandoned.

[51] Int. Cl.$^5$ .............................................. B60P 1/46
[52] U.S. Cl. ........................ 414/542; 414/462; 414/541; 414/522; 414/917; 414/921; 414/631; 254/2 R; 254/122; 224/310; 187/9 R; 187/18
[58] Field of Search ............. 414/522, 462, 539, 540, 414/541, 542, 544, 545, 921, 664, 668, 630, 631, 917, 663, 662; 187/9 R, 9 E, 18; 224/310; 254/2 R, 122

[56]   References Cited

U.S. PATENT DOCUMENTS

| | | | |
|---|---|---|---|
| 329,695 | 11/1885 | Banta . | |
| 3,608,759 | 9/1971 | Spurgeon . | |
| 3,777,922 | 12/1973 | Kirchmeyer | 414/522 X |
| 3,809,425 | 5/1974 | Blaschke | 296/22 |
| 3,912,048 | 10/1975 | Manning | 414/541 |
| 4,039,096 | 8/1977 | McAllister . | |
| 4,081,095 | 3/1978 | Wilburn et al. | 414/522 X |
| 4,083,429 | 4/1978 | Abbott | 414/541 X |
| 4,260,314 | 4/1981 | Golze | 414/462 |
| 4,278,387 | 7/1981 | Seguela et al. | 414/462 |
| 4,329,100 | 5/1982 | Golze | 414/21 |
| 4,339,223 | 7/1982 | Golze | 414/462 |
| 4,388,033 | 6/1983 | Pipes | 414/282 |
| 4,391,345 | 7/1983 | Paul | 182/141 |
| 4,439,086 | 3/1984 | Thede | 414/462 |
| 4,455,948 | 6/1984 | Torres | 108/44 |
| 4,941,797 | 7/1990 | Smillie III | 414/462 |
| 4,969,793 | 11/1990 | Pawl | 414/462 |
| 4,988,262 | 1/1991 | Gines | 414/749 |

FOREIGN PATENT DOCUMENTS 1116331  6/1968  United Kingdom .

*Primary Examiner*—Frank E. Werner
*Attorney, Agent, or Firm*—John E. Roethel

[57]   ABSTRACT the roof top carrier of the present invention has a roof top platform that moves horizontally between a storage position at the center of the roof of a motor home and an extended position adjacent the side of the motor home. A drop cradle moves vertically out of the roof top platform in its extended position to a lower position at ground level to provide user access to equipment or luggage stored in the roof top carrier. Two separate motors power the horizontal movement and the vertical movement for moving the equipment and luggage from the roof to the lower position at ground level alongside the motor home.

14 Claims, 9 Drawing Sheets

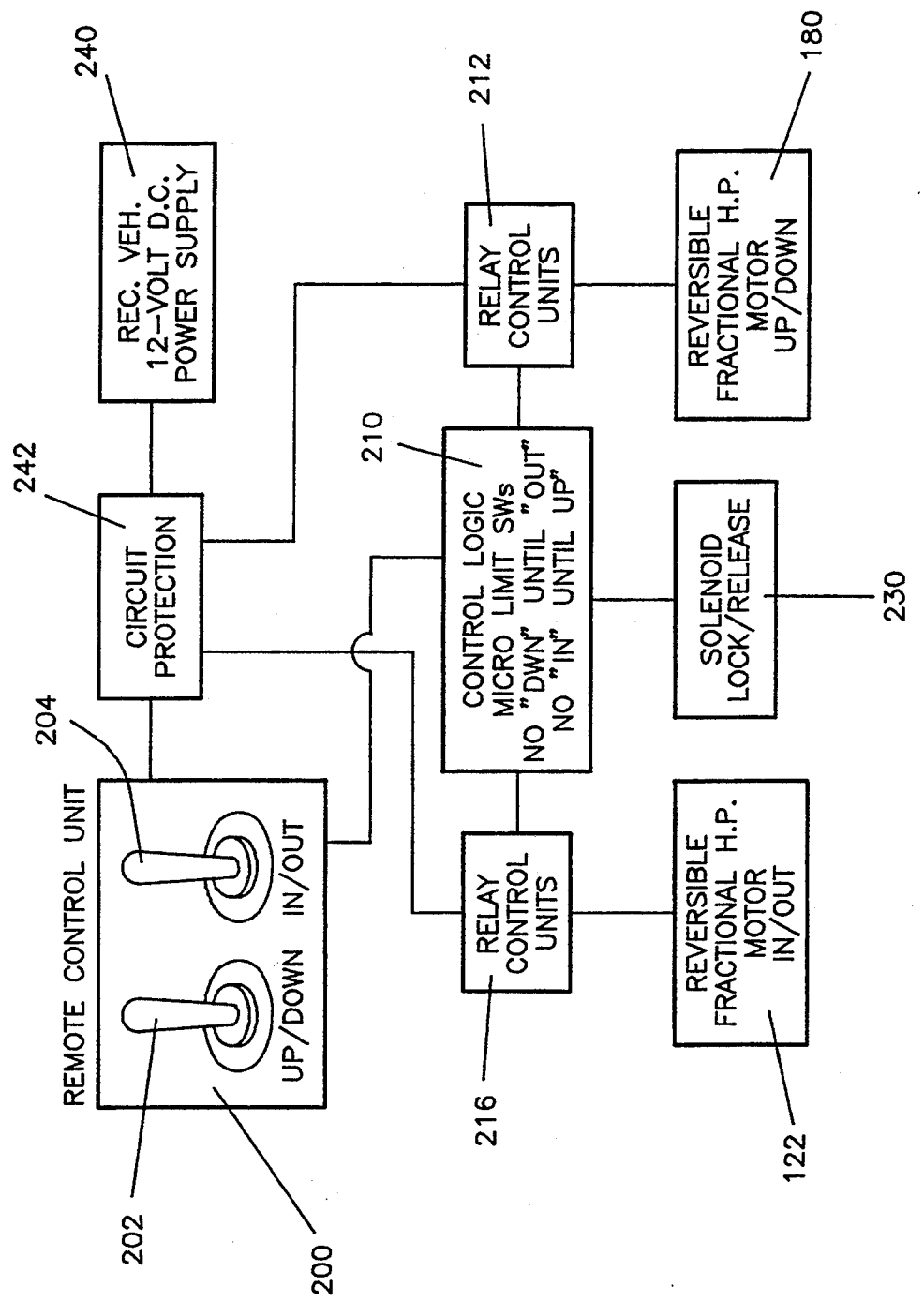

ROOF TOP CARRIER

CROSS-REFERENCE TO RELATED APPLICATIONS

This application is a continuation-in-part of application Ser. No. 07/801,482, filed Dec. 2, 1991, now abandoned.

BACKGROUND OF THE INVENTION

This invention relates to a roof top carrier, and more particularly to a roof top carrier designed particularly for recreational vehicles and motor homes and allows for convenient loading and unloading of equipment and luggage stored in the rooftop carrier.

Recreational vehicles and motor homes have become quite popular for long distance traveling and vacationing. Because the interior of these vehicles is somewhat limited and is as used for both sleeping and daytime activities, there is a need to provide extra storage space wherever possible. Roof top carriers have been developed that utilize the roof of the motor home as additional storage space.

Users of motor homes currently gain access to roof storage by climbing an access ladder on the rear of the motor home and carefully stepping along the unencumbered space near the roof storage position. After the roof load is accessed in this manner the secondary problem is to retrieve the load and return to the street level. This access to roof storage provides some hazard to the user with the danger of falling from a significant height and the hazard increases in bad weather.

In order to more conveniently and safely both load and unload the equipment or luggage stored in the roof top carriers on the motor home, it is necessary to provide an apparatus that raises and lowers the equipment and luggage between the ground and the storage position on the roof of the motor home. A number of lifting mechanisms and extending mechanisms have been proposed. Some are power operated by hydraulics and others by electric motors. In order to properly function as a roof top carrier, it is important that the carrier be able to handle a heavy load on a motor home roof and move the distances necessary to clear the side of the motor home during loading and unloading and to lower the load from the extensive height of the motor home roof to the street access height.

The roof top carrier should allow for a horizontal movement of the load from the storage position over the center of the roof of the motor home to an extended position at the side of the motor home. Then the load should be moved vertically to a location at or near ground level. It is preferable that these movements be independent and that the vertical movement be restricted so that it cannot take place until the drop cradle is clear of the motor home. Similarly, the horizontal movement should be restricted so that it cannot occur until the drop cradle is fully raised to prevent the load from hitting the side of the motor home.

The roof top carrier should also be a low profile mechanism so as not to add to the height of the motor home, yet still achieve the desired result of moving the load approximately six feet from the roof of the motor home to a location at or near the ground adjacent the side of the motor home.

It is an object of the present invention to provide a roof top carrier suitable for use on motor homes and recreational vehicles that safely stores equipment and luggage on the top of the motor home and mechanically allows storage and retrieval of the equipment and luggage without the necessity of climbing onto the roof of the motor home.

It is a feature of the present invention to provide a roof top carrier that has a roof top platform that telescopes horizontally to a position adjacent to the side of the motor home and a drop cradle that raises and lowers vertically between the top of the motor home and ground level by means of a scissor mechanism. Two independent motors operate the horizontal roof top platform and the vertical drop cradle. An electrical control system allows remote control operation of the roof top carrier.

It is an advantage of the present invention that equipment and luggage can be conveniently stored on the roof of a motor home. Access to the equipment and luggage is by means of a remote controlled roof top carrier that automatically stores and retrieves the equipment and luggage so that the user does not have to climb onto the roof of the motor home.

Other objects, features and advantages of the present invention will become apparent from a consideration of the following detailed description.

SUMMARY OF THE INVENTION

The roof top carrier of the present invention has a roof top platform that moves horizontally between a storage position at the center of the roof of a motor home and an extended position adjacent the side of the motor home. A drop cradle moves vertically out of the roof top platform in its extended position to a lower position at near ground level to provide user access to equipment or luggage stored in the roof top carrier. Two separate motors power the horizontal movement and the vertical movement for moving the equipment and luggage from the roof to the lower position at ground level alongside the motor home.

The user operates a remotely located control unit having two switches that operate the motors. The horizontal and vertical movements are controlled by limit switches. The two electric reversible motors are gear type motors that operate at low rpm and electrical consumption and provide steady torque application consistent with gear motor applications. The horizontal movement of the roof top platform is controlled by rollers restrained in C-shaped channels that allow a parallel set of three rails to telescope open until the rollers are stopped by constraints simultaneously with the control circuit automatically de-energizing the electric motor and enabling the reverse direction circuitry to be energized.

The compact stored position of the telescoping roof top platform is restrained from any telescoping movement by a cam that is operated by an electric solenoid. Activation of the solenoid allows movement of the roof top platform and a cable system powered by one of the reversible motors continues to telescope the roof top platform to its most extended position until deactivated by the control limit switch. When the roof top platform is in the extended position and power is removed from the motor, the telescoping rails remain secure in that position held taught by the cable system and the gear drive motor.

The control circuit for lowering the drop cradle is enabled when the maximum extended position is attained by the roof top platform which allows lowering to commence. Gravity acting on the drop cradle pulls the load downward under the unwinding action of the second electric gear driven reversible motor. This motor is sized to provide enough torque to raise a specified load and as such when it is in the lowering mode the winch type cable geometry unwinds at a constant slow speed. The scissor arms that attach to the drop cradle at one end and the roof top platform at the other end are the means by which the drop cradle is restrained. The scissor arms do not raise or lower the load, but only act to constrain the pathway of the allowed motion during the vertical movement of the drop cradle.

BRIEF DESCRIPTION OF THE DRAWINGS

FIG. 9 shows a block diagram of the control circuit for operating the roof top carrier of the present invention.

DETAILED DESCRIPTION OF THE PREFERRED EMBODIMENTS

Figure 1:
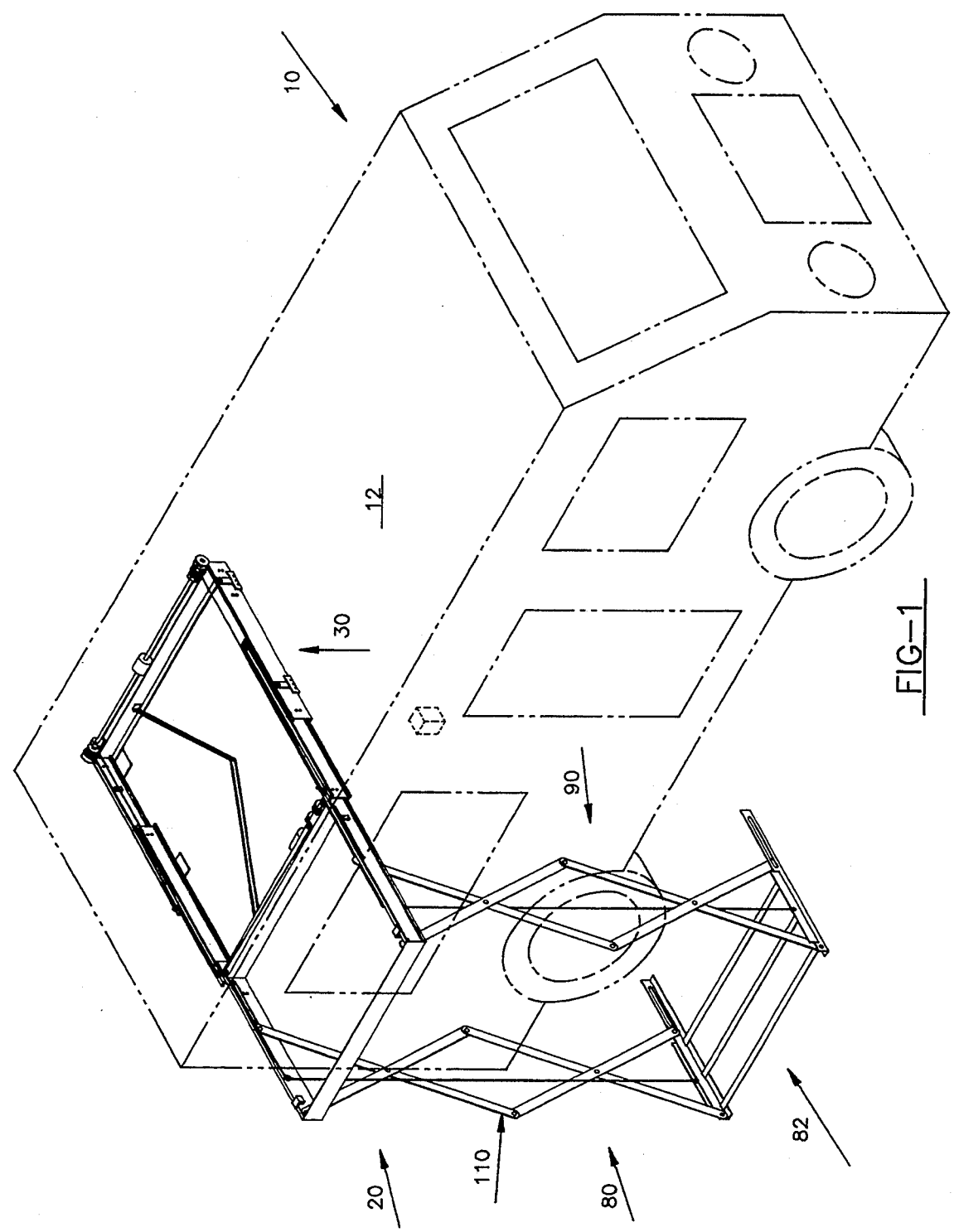
FIG. 1 shows an isometric view of the roof top carrier of the present invention in its loading position in operable relationship to a recreational vehicle shown in phantom.
Figure 2:
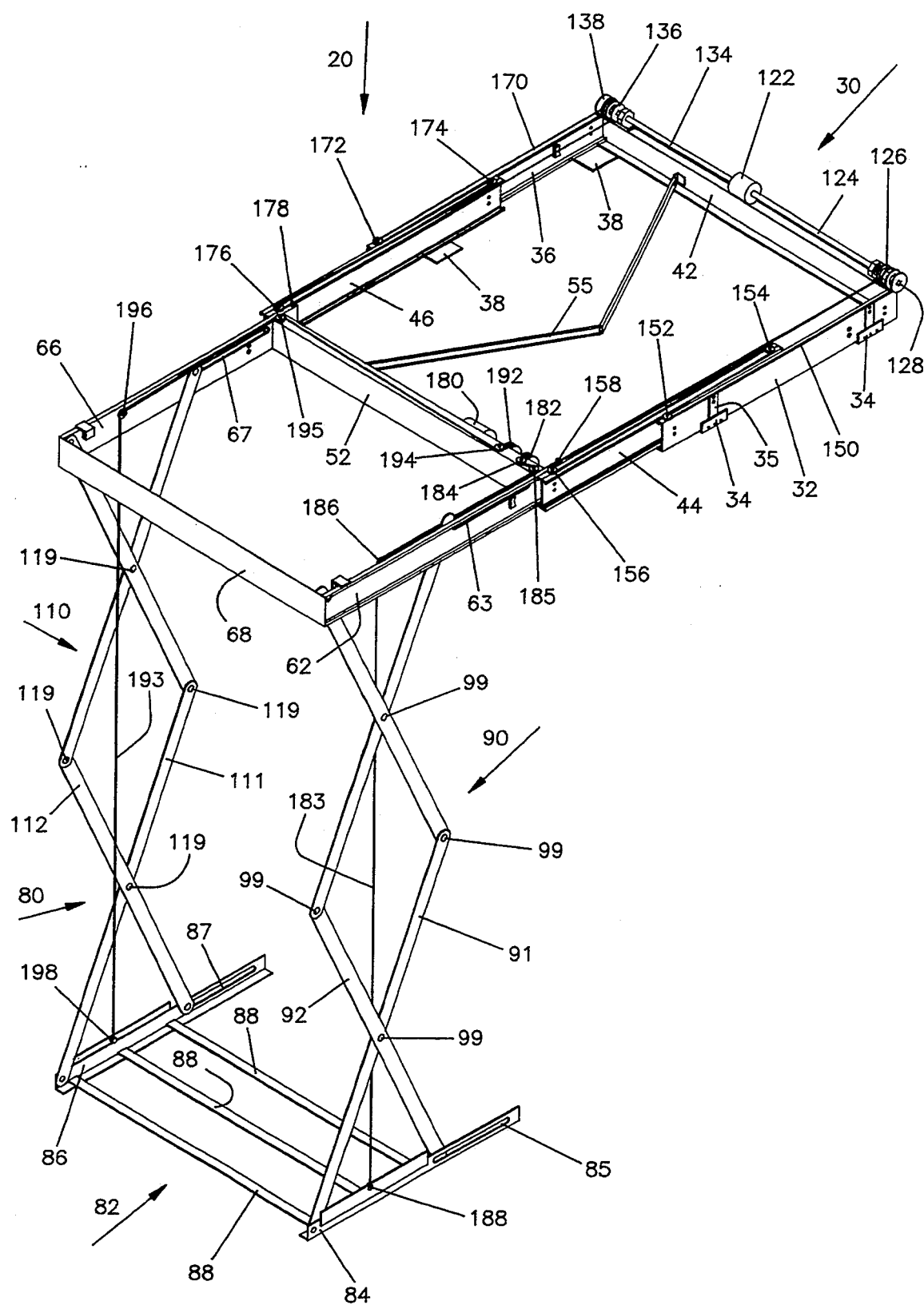
FIG. 2 shows an isometric view of the roof top carrier of the present invention in its loading position.

The roof top carrier of the present invention is shown generally at 20 in FIGS. 1 and 2. The roof top carrier 20 is designed to be permanently attached to the roof 12 of a motor home or recreational vehicle 10 by means of rivets or in any other suitable manner. The roof top carrier 20 is operable between a retracted storage position and an extended loading and unloading position to move a load from the ground to the roof 12 of the motor home 10 or to unload the load from the roof 12 of the motor home 10 back to the ground.

The roof top carrier 20 comprises a roof top platform 30 and a drop cradle 80. The roof top platform 30 includes a front fixed rail 32 attached to the roof 12 of the motor home 10 by angle aluminum bases 34 and a rear fixed rail 36 also attached to the roof 12 of the motor home 10 by angle aluminum bases 38. Adjustable height support elements 35 are interposed between the roof top platform 30 and the angle aluminum bases 34, 38. Any suitable adjustable height support elements 35 can be used such as overlapping plates connected by pins through corresponding apertures in the plates. The purpose of these adjustable height support elements 35 is to remove excess vertical space so that no vertical motion of the retracted mechanism results during road travel. These adjustable height support elements 35 also allow the roof top platform 30 to be positioned in a horizontal plane to accommodate for the curvature of the roof 12 of a typical motor home 10.

The inner ends of the front fixed rail 32 and rear fixed rail 36 are joined together by a inner fixed support rail 42 disposed therebetween. Positioned in telescoping relationship on the inside of the front fixed rail 32 and the rear fixed rail 36 are a front mid slide rail 44 and rear mid slide rail 46, respectively. Positioned in telescoping relationship on the inside of the front mid slide rail 44 and the rear mid slide rail 46 are a front outer slide rail 62 and rear outer slide rail 66, respectively. The front outer slide rail 62 and rear outer slide rail 66 are each load carrying members and support the drop cradle 80 as is explained below. A mid cross rail 52 extends between the inner near ends of the front outer slide rail 62 and rear outer slide rail 66 and an outer support rail 68 extends between the outer ends of the front outer slide rail 62 and rear outer slide rail 66 to provide structural support. A hinged guide strap 55 is attached to the inner fixed support rail 42 and the mid cross rail 52 to assist in maintaining the electrical harness alignment during movement of the mid cross rail 52.

A drop cradle 80 is attached to the front outer slide rail 62 and rear outer slide rail 66. The drop cradle 80 includes a drop cradle base 82 upon which the load to be raised to the roof 12 of the motor home 10, stored thereon and then lowered from the roof 12 of the motor home 10 is positioned. Typical loads include equipment, luggage or other items that the user of the motor home 10 may require. Storage pods are typically used to provide a weather tight environment for a user's loads.

The drop cradle base 82 comprises a front support arm 84 and a rear support arm 86 with a plurality of cross arms 88 extending therebetween forming the area upon which the load to be stored can be placed. The up and down movement of the drop cradle base 82 is guided by means of the front scissor mechanism 90 having a front fixed scissor arm 91 and front movable scissor arm 92 and the rear scissor mechanism 110 having a rear fixed scissor arm 111 and a rear movable scissor arm 112.

The lower end of the front fixed scissor arm 91 is fixedly attached to the front support arm 84 and the upper end of the front fixed scissor arm 91 is fixedly attached to the front outer slide rail 62. The lower end of the front movable scissor arm 92 is slidably attached in the slot 85 of the front support arm 84 and the upper end of the front movable scissor arm 92 is slidably attached in the slot 63 of the front outer slide rail 62. Similarly, the lower end of the rear fixed scissor arm 111 is fixedly attached to the rear support arm 86 and the upper end of the rear fixed scissor arm 111 is fixedly attached to the rear outer slide rail 66. The lower end of the rear movable scissor arm 112 is slidably attached in the slot 87 of the rear support arm 86 and the upper end of the rear movable scissor arm 112 is slidably attached in the slot 67 of the rear outer slide rail 66. A plurality of intermediate front pivot points 99 and rear pivot points 119, respectively, allow for the scissoring action of the front scissor mechanism 90 and rear scissor mechanism 110.

Figure 3:
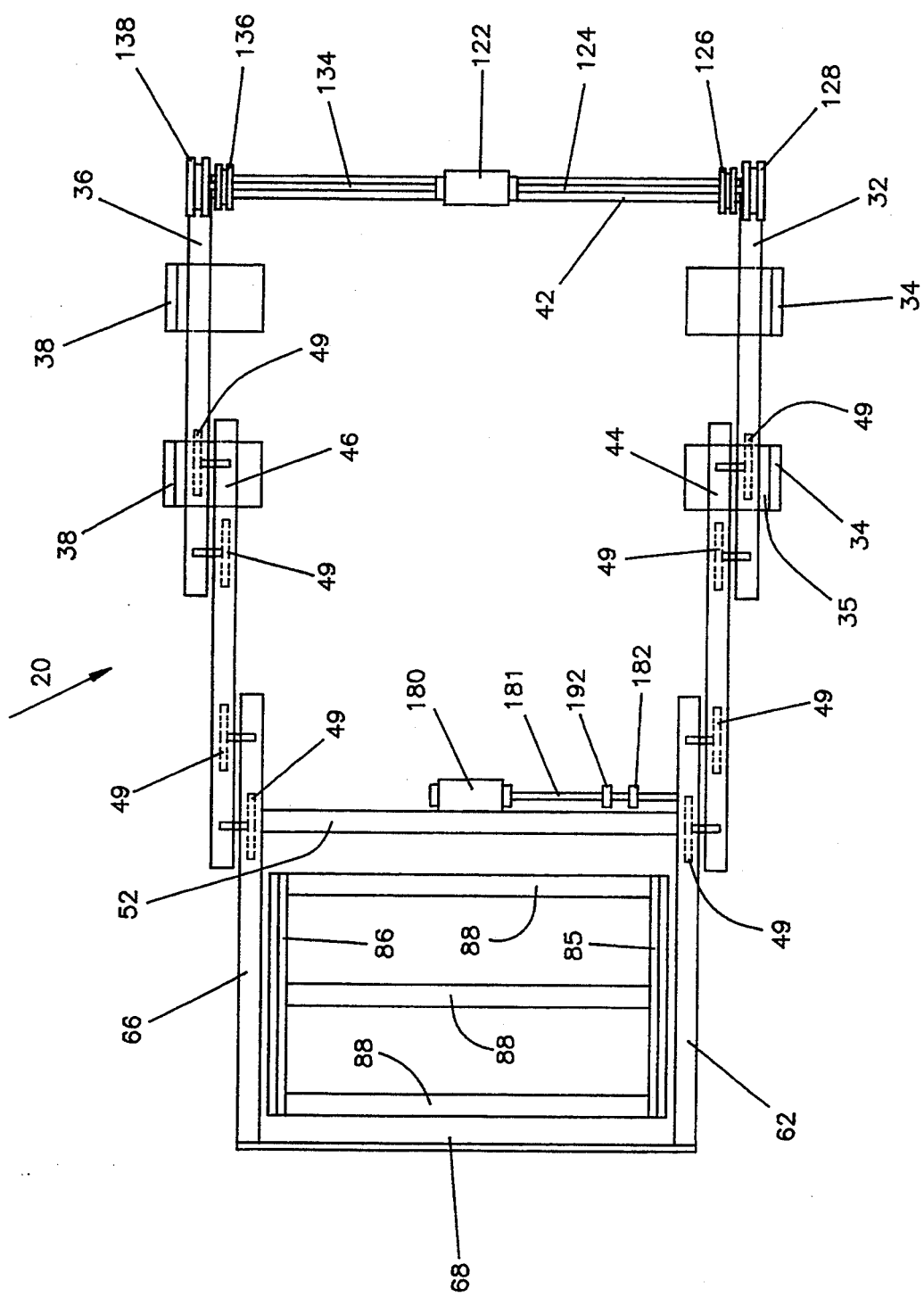
FIG. 3 shows a top plan view of the roof top carrier of the present invention in its loading position showing the wheels in phantom.

As shown more fully in FIG. 3, a plurality of guide rollers 49 riding in the guide channels of each of the front fixed rail 32, rear fixed rail 36, front mid slide rail 44, rear mid slide rail 46, front outer slide rail 62 and rear outer slide rail 66 function to effect the telescoping movement of the roof top platform 30 between its retracted storage position and its extended loading and unloading position.

Each of the front fixed rail 32, rear fixed rail 36, front mid slide rail 44, rear mid slide rail 46, front outer slide rail 62 and rear outer slide rail 66 are preferably identical in cross sectional shape and size and preferably of equal length. Each of these elements has a generally C-shaped cross section functioning as a channel guide for the guide rollers 49 as is shown more clearly in FIGS. 6 and 7. The C-shape restricts the guide rollers 49 within the channel guide to a minimum of movement out of the plane of the planned motion. The C-shaped channel guide permits the guide rollers 49 to roll along the channel guide to achieve extension and retraction of the movable elements with only minimal lateral or vertical motion that would cause interference with the capability of the roof top platform 30 to move a load from a retracted storage position to the designated extended loading or unloading position.

The front fixed rail 32, rear fixed rail 36, front mid slide rail 44, rear mid slide rail 46, front outer slide rail 62 and rear outer slide rail 66 are preferably made of a material that does not contribute more than 12% of the maximum load carrying ability of the roof top platform 30. Similarly, the guide rollers 49 and their included axles are made of a material that does not contribute more than 2% of the maximum load carrying ability of the roof top platform 30. Each of the front fixed rail 32, rear fixed rail 36, front mid slide rail 44, rear mid slide rail 46, front outer slide rail 62 and rear outer slide rail 66 as well as the guide rollers 49 are preferably made of a sufficiently rigid material so that significant deformation of these elements will not occur. This will ensure that the roof top platform 30 does not deform and obstruct the inward and outward movement of the roof top platform 30 that is needed to move the load from the roof 12 to the outer position aside the motor home 10.

Figure 4:
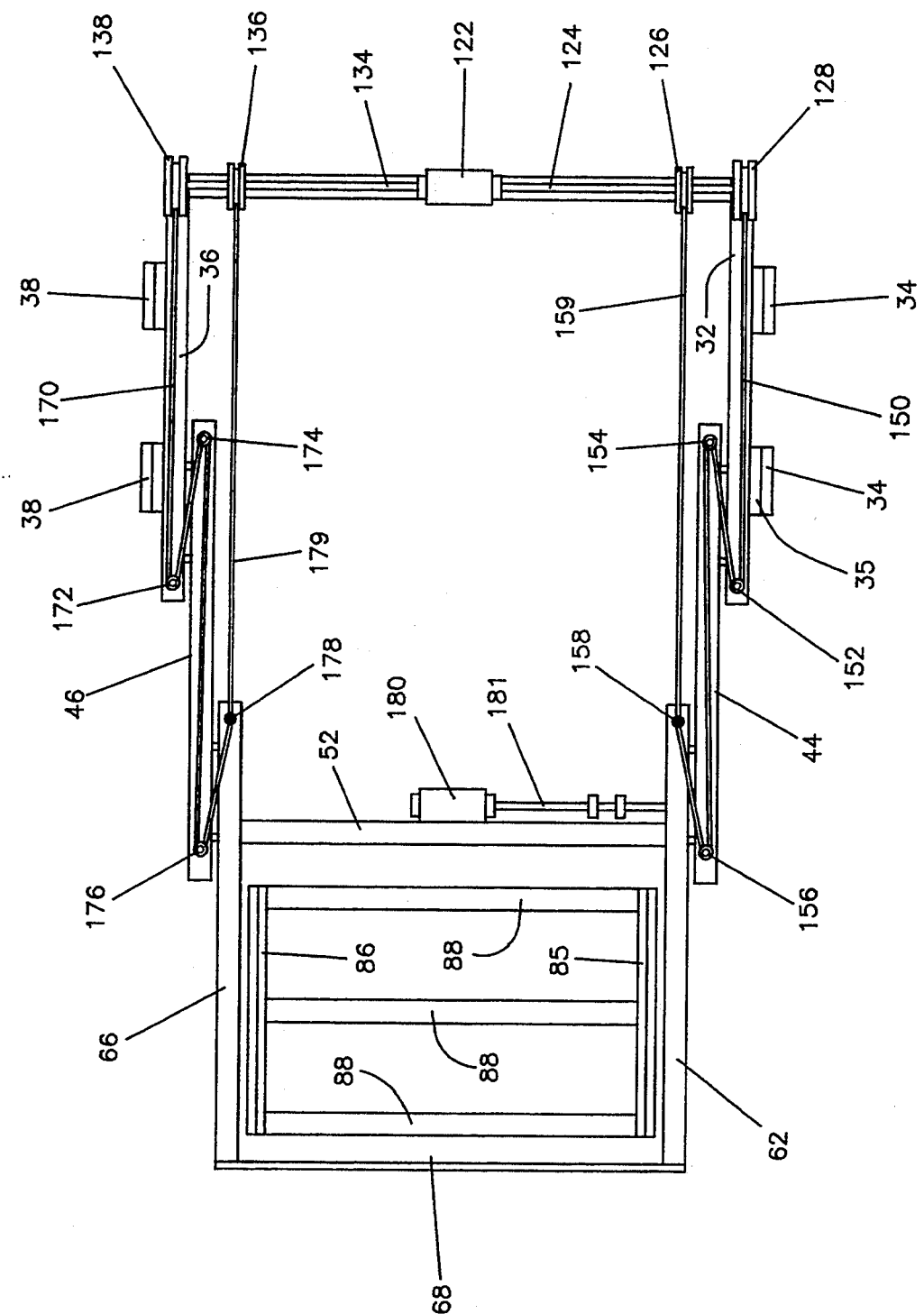
FIG. 4 shows a top plan view of the roof top carrier of the present invention in its loading position showing the horizontal movement cable system.

The inward and outward movement of the roof top platform 30 is effected by a horizontal drive motor and cable assembly as shown in FIG. 4. Mounted on the inner fixed support rail 42 is a reversible horizontal drive motor 122 having a front shaft 124 running through a front retraction drum 126 to a front extension drum 128. The horizontal drive motor also has a rear shaft 134 running through a rear retraction drum 136 to a rear extension drum 138. The diameters of the front extension drum 128 and the rear extension drum 138 are the same. The diameters of the front retraction drum 126 and the rear retraction drum 138 are also the same. The extension drums 128, 138 have diameters that are slightly larger than the diameters of the retraction drums 126, 136 because more cable is wound up during the extension for the same amount of shaft rotation.

The inner fixed support rail 42 provides the necessary structural support for the horizontal drive motor 122 and cable assemblies to enable the movement of the roof top platform 30 in a horizontal plane of motion inward and outward relative to the roof 12 of the motor home 10.

The front extension drum 128 carries a first front horizontal cable 150. The first front horizontal cable 150 extends from the front extension drum 128 to a first front guide pulley 152 mounted on the outer end of the fixed rail 32 back to a second front guide pulley 154 mounted on the inner end of the front mid slide rail 44 forward to a third front guide pulley 156 mounted on the outer end of the front mid slide rail 44 back to an anchor point 158 mounted on the inner end of the front outer slide rail 62. The front retraction drum 126 carries a second front horizontal cable 159 that is also connected to the anchor point 158 on the front outer rail 62.

The rear extension drum 138 carries a first rear horizontal cable 170. The first rear horizontal cable 170 extends from the rear extension drum 138 to a first rear guide pulley 172 mounted on the outer end of the rear fixed rail 36 back to a second rear guide pulley 174 mounted on the inner end of the rear mid slide rail 46 forward to a third rear guide pulley 176 mounted on the outer end of the rear mid slide rail 46 back to an anchor point 178 mounted on the inner end of the rear outer slide rail 66. The rear retraction drum 136 carries a second rear horizontal cable 179 that is also connected to the anchor point 178 on the rear outer slide rail 66.

These four cables, the first front horizontal cable 150, the second front horizontal cable 159, the first rear horizontal cable 170 and the second rear horizontal cable 179 function with the horizontal drive motor 122 to cause the horizontal inward and outward movement of the roof top platform 30. All the cables are maintained taut during any inward or outward motion because of the differences in the diameters of the extension drums 128, 138 relative to the retraction drums 126, 136.

Figure 5:
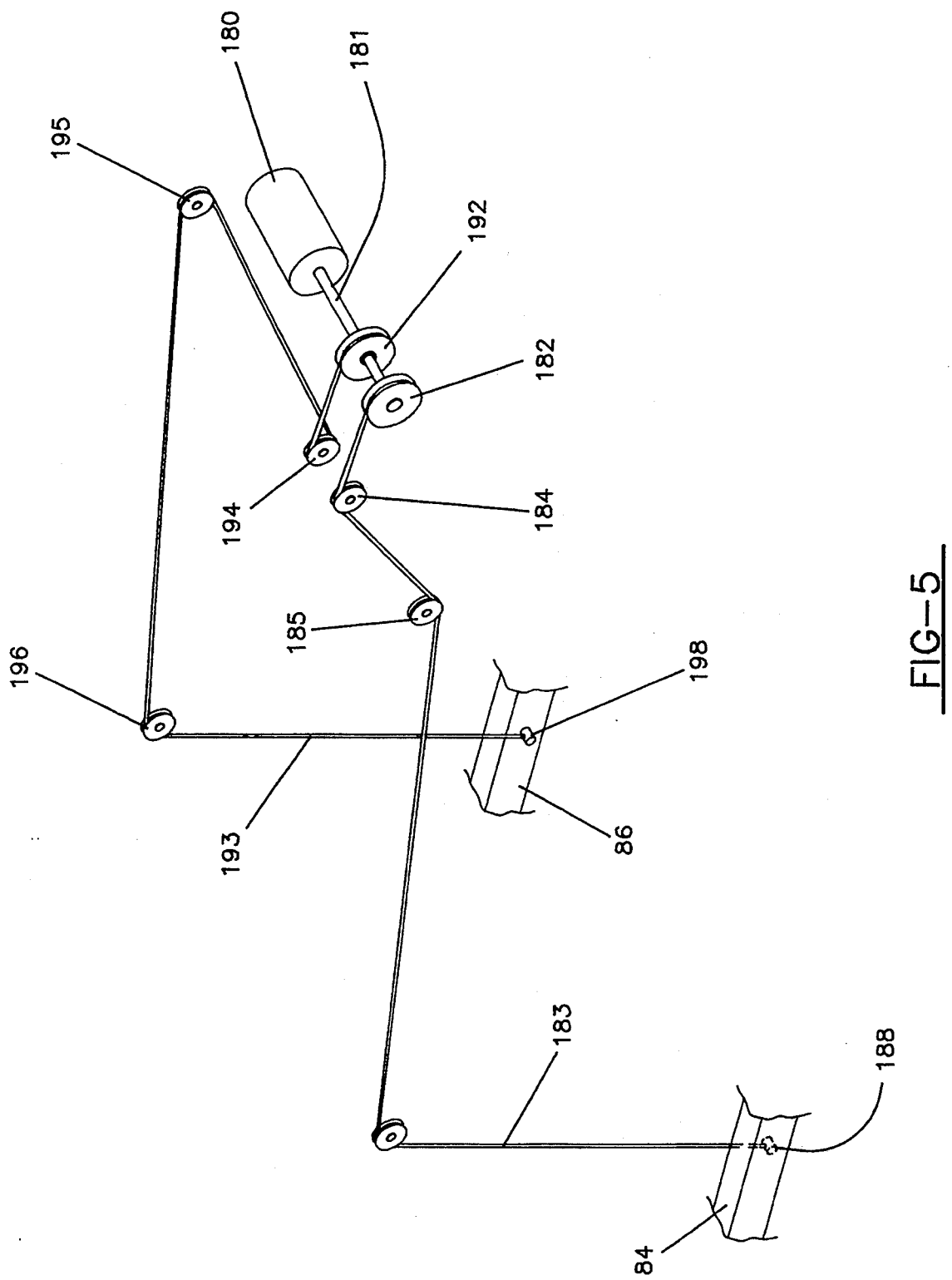
FIG. 5 shows a schematic view of vertical movement cable system for the roof top carrier of the present invention.

As shown in FIGS. 2 and 5, the raising and lowering movement of the drop cradle 80 is effected by a vertical drive motor and cable assembly. A vertical drive motor 180 is mounted on the mid cross rail 52. A drive shaft 181 extends from the vertical drive motor 180 and carries the front cable lowering spool 182 and rear cable lowering spool 192 respectively. A front vertical cable 183 is wound around the front cable lowering spool 182 and extends therefrom around a fourth front guide pulley 184 and a fifth front guide pulley 185 each mounted on the top of the mid cross rail 52, forward around a sixth front guide pulley 186 mounted on the inside of the front outer slide rail 62 and down to a front cable anchor connection 188 mounted on the front support arm 84. Similarly, a rear vertical cable 193 is wound around the rear cable lowering spool 192 and extends therefrom around a fourth rear guide pulley 194 and a fifth rear guide pulley 195 each mounted on the top of the mid cross rail 52, forward around a sixth rear guide pulley 196 mounted on the inside of the rear outer slide rail 66 and down to a rear cable anchor connection 198 mounted on the rear support arm 86.

In operation, the roof top carrier 20 functions as follows. Beginning with the loading/unloading position shown in FIG. 1, the front scissor mechanism 90 is fully extended with the drop cradle base 82 suspended near the ground. Likewise, the roof top platform 30 is fully extended to the outside of the motor home 10. In order to return the roof top carrier 20 to its storage position on the roof 12 of the motor home 10, first the vertical drive motor 180 is activated which causes the front vertical cable 183 and the rear vertical cable 193 to be wound onto the front cable lowering spool 182 and the rear cable lowering spool 192, respectively. This raises the drop cradle base 82 and the front scissor mechanism 90 and rear scissor mechanism 110 collapse to accommodate the upward movement of the drop cradle base 82. When the drop cradle base 82 reaches its fully retracted position between the front outer slide rail 62 and the rear outer slide rail 66, the vertical drive motor 180 is stopped.

Figure 7:
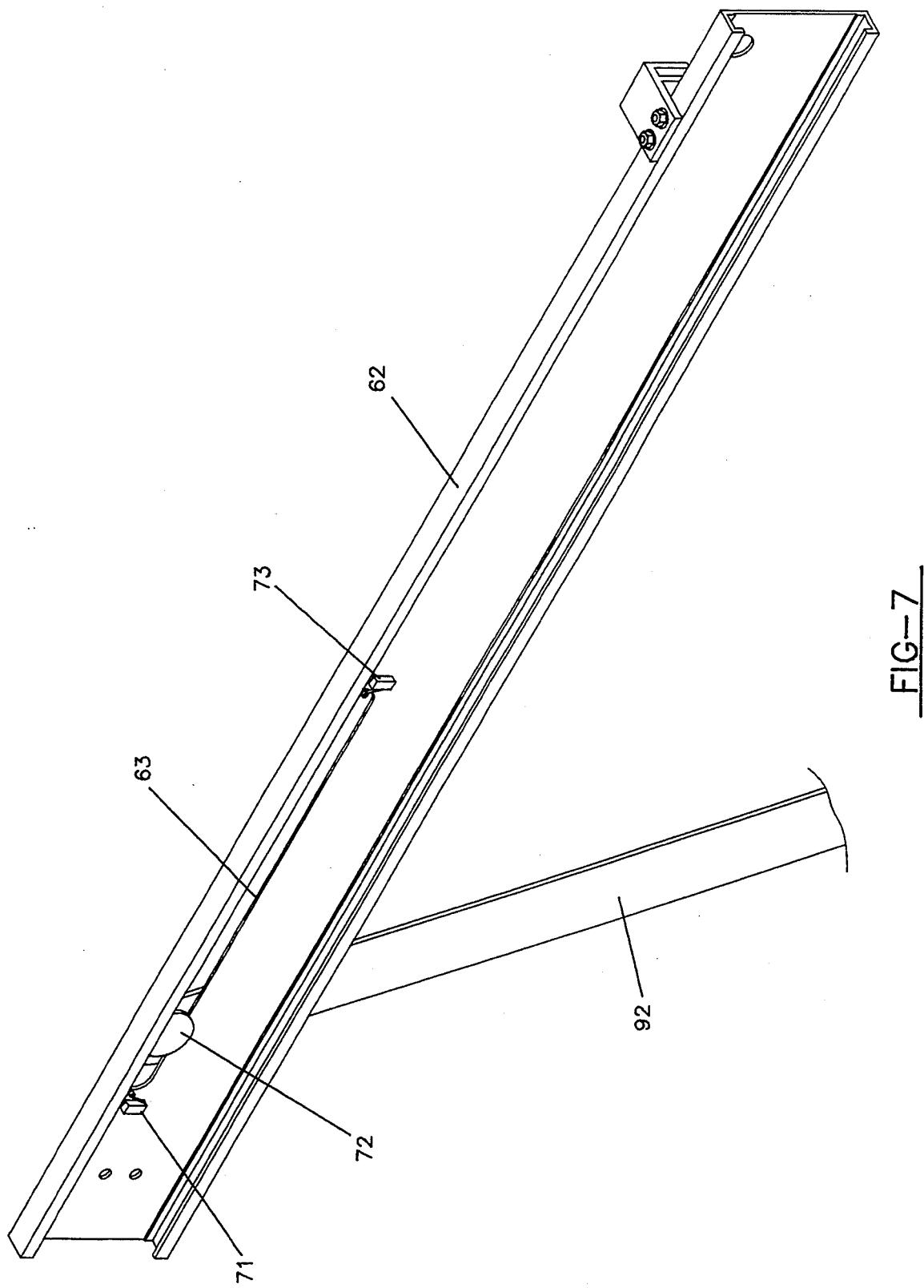
FIG. 7 shows an isometric view of the front outer slide rail of the roof top carrier of the present invention.

As shown in FIG. 7, a first limit switch 71 is provided adjacent the outside end of the slot 63 to deenergize the vertical drive motor 180 when the drop cradle base 82 reaches its upper position. The first limit switch 71 is triggered by a knob 72 on the upper end of the front movable scissor arm 92. A second limit switch 73 is also provided adjacent the inside end of the slot 63 which is triggered by the knob 72 when the drop cradle base 82 reaches its lower position.

The horizontal drive motor 122 is then activated which causes the first front horizontal cable 150 and first rear horizontal cable 170 to be unwound from the rear extension drum 138 and the front extension drum 128, respectively. Simultaneously, the front retraction drum 126 and rear retraction drum 136 are turning in the windup direction and cause the second front horizontal cable 159 and the second rear horizontal cable 179 to shorten which thereby retracts the front fixed rail 32, front mid slide rail 44 and front outer slide rail 62 and the rear fixed rail 36, rear mid slide rail 46 and rear outer slide rail 66, respectively, to their overlapping retracted positions.

This pulls the front outer slide rail 62 telescopically into the front mid slide rail 44 and the rear outer slide rail 66 telescopically into the rear mid slide rail 46. Continued operation of the horizontal drive motor 122 pulls the front mid slide rail 44 into the front fixed rail 32 and the rear mid slide rail 46 into the rear fixed rail 36 until the entire assembly comes to rest in its position at approximately the center of the roof 12 of the motor home 10.

Figure 6:
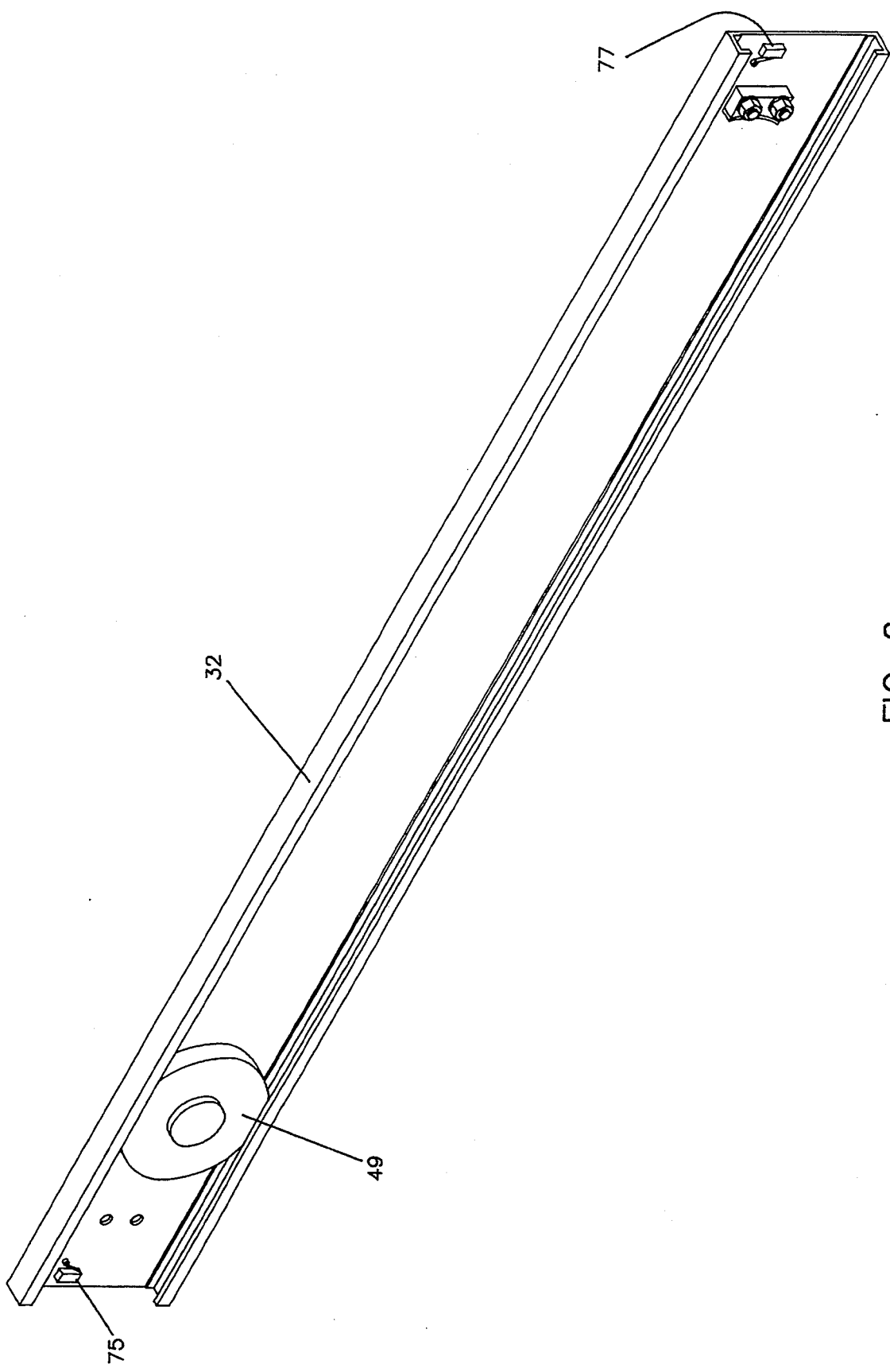
FIG. 6 shows an isometric view of the front fixed rail of the roof top carrier of the present invention.

As shown in FIG. 6, a third limit switch 75 is provided adjacent the inner end of the front fixed rail 32 to deenergize the horizontal drive motor 122 when the roof top platform 30 reaches its inner most position. The third limit switch 75 is triggered by the guide roller 49. A fourth limit switch 77 is also provided adjacent the outer end of the front fixed rail 32 which is triggered by the guide roller 49 when the roof top platform 30 reaches its outermost position.

As described previously, the front fixed rail 32 and the rear fixed rail 36 are solely supported on the roof 12 of the motor home 10 by the angle aluminum bases 34, four in total. When the roof top platform 30 is fully retracted over the center of the roof 12 of the motor home 10, the front fixed rail 32 and rear fixed rail 36 provide constraint to the load in the forward and rearward directions while the load, which is secured by the front support arm 84 and rear support arm 86 rests on the four angle aluminum bases 34 which are secured to the roof 12 of the motor home 10. In effect, the front support arm 84 and rear support arm 86 are wedged into a secure motionless fit against the four angle aluminum bases 34 during the retraction process carried out by the horizontal drive motor 122.

When it is desired to remove the load from the roof 12 of the motor home 10, the process is reversed. The horizontal drive motor 122 turns in the reverse direction and causes front extension drum 128 and rear extension drum 138 to shorten the front horizontal cable 150 and rear horizontal cable 170, respectively, resulting in the load moving horizontally across the roof 12 until the front outer slide rail 62 and rear outer slide rail 66 reach their fully extended positions. The fourth limit switch 77 is provided to deenergize the horizontal drive motor 122 when the front outer slide rail 62 and rear outer slide rail 66 reach their fully extended positions.

The drop cradle base 82 then moves downwardly by gravity as the front scissor mechanism 90 and rear scissor mechanism 110 extend. The vertical drive motor 180 controls the extending lengths of the front vertical cable 183 and rear vertical cable 193 to control the speed of descent of the drop cradle base 82.

The horizontal drive motor 122 is preferably a fractional horse-power motor with a mechanical advantage sufficient to extend or retract the roof top platform 30 within less than one minute of operation time and to maintain any load carried thereon in a stationary fixed position in the horizontal plane at any time electrical power is removed from the horizontal drive motor 122. Any suitable mechanically advantaged type of motor can be used, such as a motor having a worm gear arrangement which inhibits free wheeling with the power off.

Similarly the vertical drive motor 180 is preferably a fractional horse-power motor with a mechanical advantage sufficient to raise a specified load a distance of approximately six feet and to maintain the height position fixed at any time that electrical power is removed from the vertical drive motor 180. Any suitable mechanically advantaged type of motor can be used, such as a motor having a worm gear arrangement which inhibits free wheeling with the power off.

This operation of the roof top carrier 20 is controlled by an electrical remote control unit 200 shown in block diagram form in FIG. 9. At any suitable location on the motor home 10, there is provided two switches accessible by the user of the motor home 10 to operate the roof top carrier 20. In the preferred embodiment, the two switches are illuminated so that their usage positions are easily visible to the user in bad lighting or nighttime conditions. A vertical movement switch 202 and a horizontal movement switch 204 can be engaged by the user to cause the vertical drive motor 180 or the horizontal drive motor 122 to function. A control logic circuit 210 is provided that functions in response to the position of the various limit switches 71, 73, 75 and 77.

The control system is designed so that the vertical drive motor 180 is not operable unless the roof top platform 30 is in its fully extended position at the outside of the motor home and this fully extended position is detected by the fourth limit switch 77. The horizontal drive motor 122 is not operable unless the drop cradle 80 is in its fully upward position inside the roof top platform 30 and this fully upward position is detected by the first limit switch 71. Thus, the control system prevents any improper movement of the roof top carrier 10.

The control system also includes an electrical solenoid controlled lock 230 that serves to secure the roof top platform 30 in its fully retracted position over the center of the roof 12 of the motor home 10.

Figure 8:
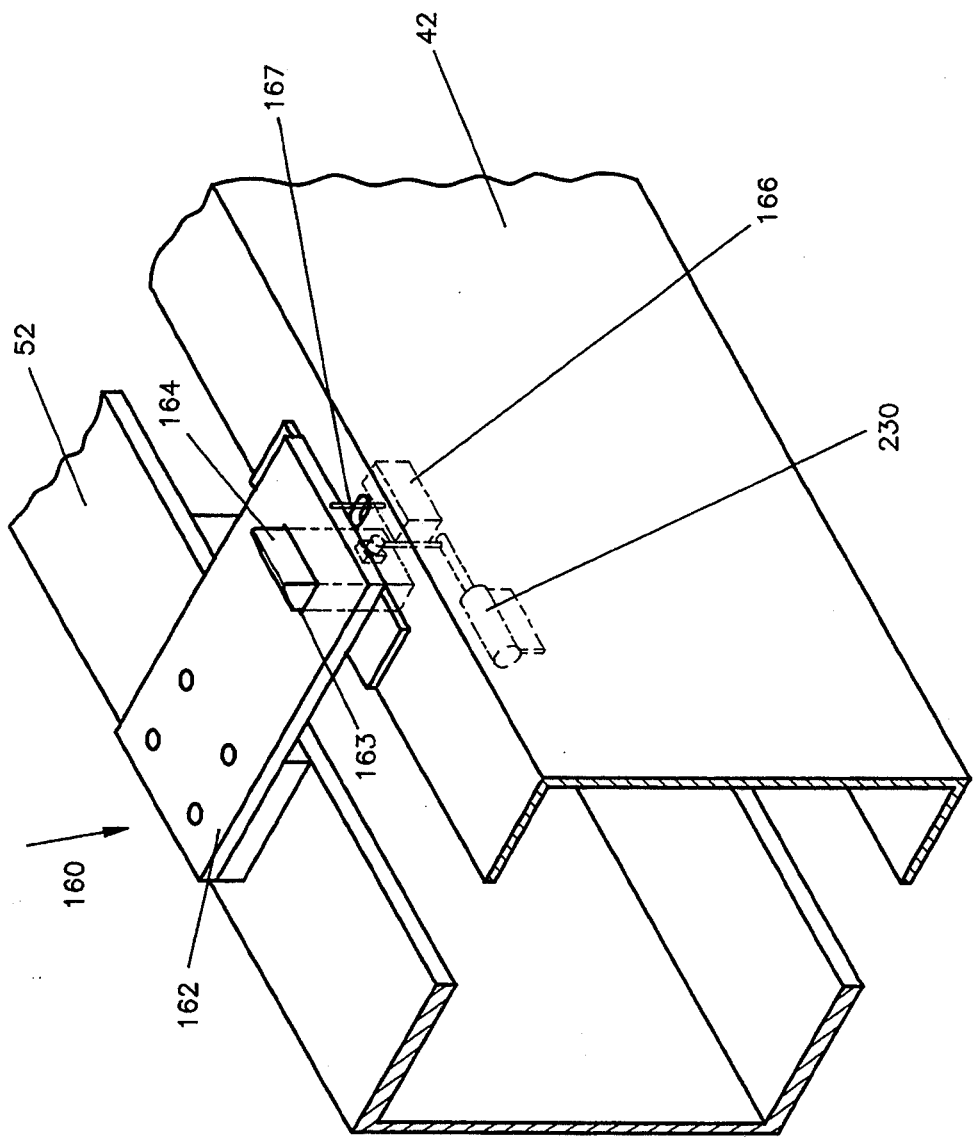
FIG. 8 shows an isometric view of the solenoid locking assembly of the roof top carrier of the present invention.

When the roof top platform 30 is in its innermost position over generally the center top of the motor home 10, a solenoid locking assembly 160 shown in FIG. 8 is used to lock the roof top platform in place. The solenoid locking assembly 160 includes a locking plate 162 mounted on the mid cross rail 52 and a locking cam 164 mounted on the inner fixed support rail 42. The locking cam 164 is spring loaded in the "up" position and, in its locked position, extends through an opening 163 in the locking plate 162.

As the roof top platform 30 approaches the fully retracted storage position, the mid cross rail 52 moves adjacent to the inner fixed support rail 42. The locking plate 162 engages the locking cam 164 and pushes the locking cam 162 downward until the locking cam pops into the opening 163 in the locking plate 162. This is the locked position. In the locked position, the locking plate 162 engages a pin 167 attached to a microswitch 166 that illuminates an indicator (not shown) on the remote control unit 200 to advise the user that the roof top platform 30 is locked in place.

The solenoid 230 is used to unlock the locking assembly 160 to allow the roof top platform 30 to extend out to the unloading position. When the user activates the horizontal movement switch 204, the control logic 210 sends a signal to the solenoid 230 which causes the locking cam 164 to be lowered out of the opening 163 in the locking plate 162. This allows horizontal movement of the roof top platform 30.

The control system includes additional elements including relay control units 212 and 216 between the control logic 210 and the vertical drive motor 180 and the horizontal drive motor 122, respectively. The remote control unit 200 operates from the power supply 240 of the motor home and includes appropriate circuit protection 242.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. In a roof top carrier adapted to be mounted on the roof of a motor home and movable between a retracted position and an extended position to move a load from the roof of the motor home to a position near ground level adjacent to the motor home, the improvement comprising:
    a) two spaced apart fixed rails;
    b) four sliding elements movable relative to one another in a horizontal plane, the sliding elements comprising two spaced apart mid slide rails and two spaced apart outer slide rails, the outer slide rails being a load attaching elements;
    c) a horizontal drive motor and cable means interconnecting the spaced apart fixed rails and the sliding elements for moving the sliding elements telescopically to extend the outer slide rails to a position remote from the fixed rails;
    d) guide channels formed in each of the fixed rails, the mid slide rails and the outer slide rails;
    e) rollers mounted to each of the fixed rails, the mid slide rails and the outer slide rails and operable inside in the guide channels to effect horizontal movement of each of the fixed rails, the mid slide rails and the outer rails;
    f) a drop cradle attached to the spaced apart outer slide sections, the drop cradle including a drop cradle base and a pair of scissor mechanisms connecting the drop cradle base to the spaced apart outer slide sections; and
    g) a vertical drive motor and cable means attached to the drop cradle for raising and lowering the drop cradle from a position between the spaced apart outer sections and a position adjacent ground level adjacent the motor home.

2. The roof top carrier of claim 1 in which each of the fixed rails, the mid slide rails and the outer rails are identical in cross sectional shape and size and identical in length and being configured to restrict the rollers within the guide channels to minimize movement of the rails out of a plane of desired motion.

3. The roof top carrier of claim 1 in which the fixed rails, the mid slide rails and the outer rails are of a material that does not contribute more than 12% of a maximum load carrying ability of these rails.

4. The roof top carrier of claim 1 in which the rollers and axles are of a material that does not contribute more than 2% of a maximum load carrying ability of the rails.

5. The roof top carrier of claim 1 in which the fixed rails, the mid slide rails and the outer rails and the rollers and axles are made of a material that precludes significant deformation.

6. The roof top carrier of claim 1 further including a inner fixed support rail mounted between the spaced apart fixed rails for supporting the horizontal drive motor and cable means.

7. The roof top carrier of claim 1 further including adjustable height support elements attached to the roof of the motor home and the fixed rails whereby the roof top carrier can be maintained in a horizontal plane on a curved roof of the motor home and the load maintained in the roof top carrier is transferred directly to the height support elements and suspended off the roof of the motor home.

8. The roof top carrier of claim 1 wherein the horizontal drive motor and cable means includes a fractional horsepower motor with a mechanical advantage capable to extend or retract the movable elements within less than one minute and to maintain a stationary fixed position of a roof top platform in the horizontal plane at any time power is discontinued to the motor.

9. The roof top carrier of claim 1 further including a mid cross rail supporting the vertical drive motor and cable system.

10. The roof top carrier of claim 1 in which the vertical drive motor and cable means includes a fractional horsepower motor with a mechanical advantage capable to raise a specified load a distance of approximately six feet and to maintain the drop cradle at a fixed height position at any time that power is discontinued to the motor.

11. The roof top carrier of claim 1 further including a remotely located control unit comprising a horizontal motion switch for activating the horizontal drive motor and cable means and a vertical motion switch for activating the vertical drive motor and cable means, a plurality of limit switches located on the roof top carrier and positioned and electrically interconnected to the control unit to provide a control logic of operation that prevents any vertical motion of the drop cradle until full horizontal movement of a roof top platform is achieved and to provide a control logic of operation that prevents any horizontal movement of the roof top platform until the drop cradle is in a fully raised position.

12. The roof top carrier of claim 11 further including a solenoid locking assembly to secure the roof top platform in a fully retracted position over the roof of the motor home until horizontal movement is desired.

13. The roof top carrier of claim 12 further including a power supply and circuit protection for the control unit and at least one relay control unit for connecting each of the switches to its respective drive motor and cable means.

14. A roof top carrier adapted to be mounted on the roof of a motor home comprising:
    a) a roof top platform having telescoping rail sections, the rail sections including a pair of spaced apart fixed rail sections, a pair of spaced apart mid slide rail sections and a pair of spaced apart outer slide sections;

b) a horizontal drive motor attached by a cable system to the rail sections of the roof top platform;

c) a drop cradle attached to the pair of spaced apart outer slide sections, the drop cradle including a drop cradle base and a pair of scissor mechanisms connecting the drop cradle base to the spaced apart outer slide sections;

d) a vertical drive motor attached by a cable system to the drop cradle;

e) and a control system for operating independently each of the drive motors whereby the roof top platform can be horizontally moved between a storage position over the roof of the motor home and an extended position over a side of the motor and the drop cradle can be moved between a raised position between the spaced apart outer slide sections and a lowered position adjacent ground level beside the motor home.

* * * * *